Patented Feb. 7, 1933

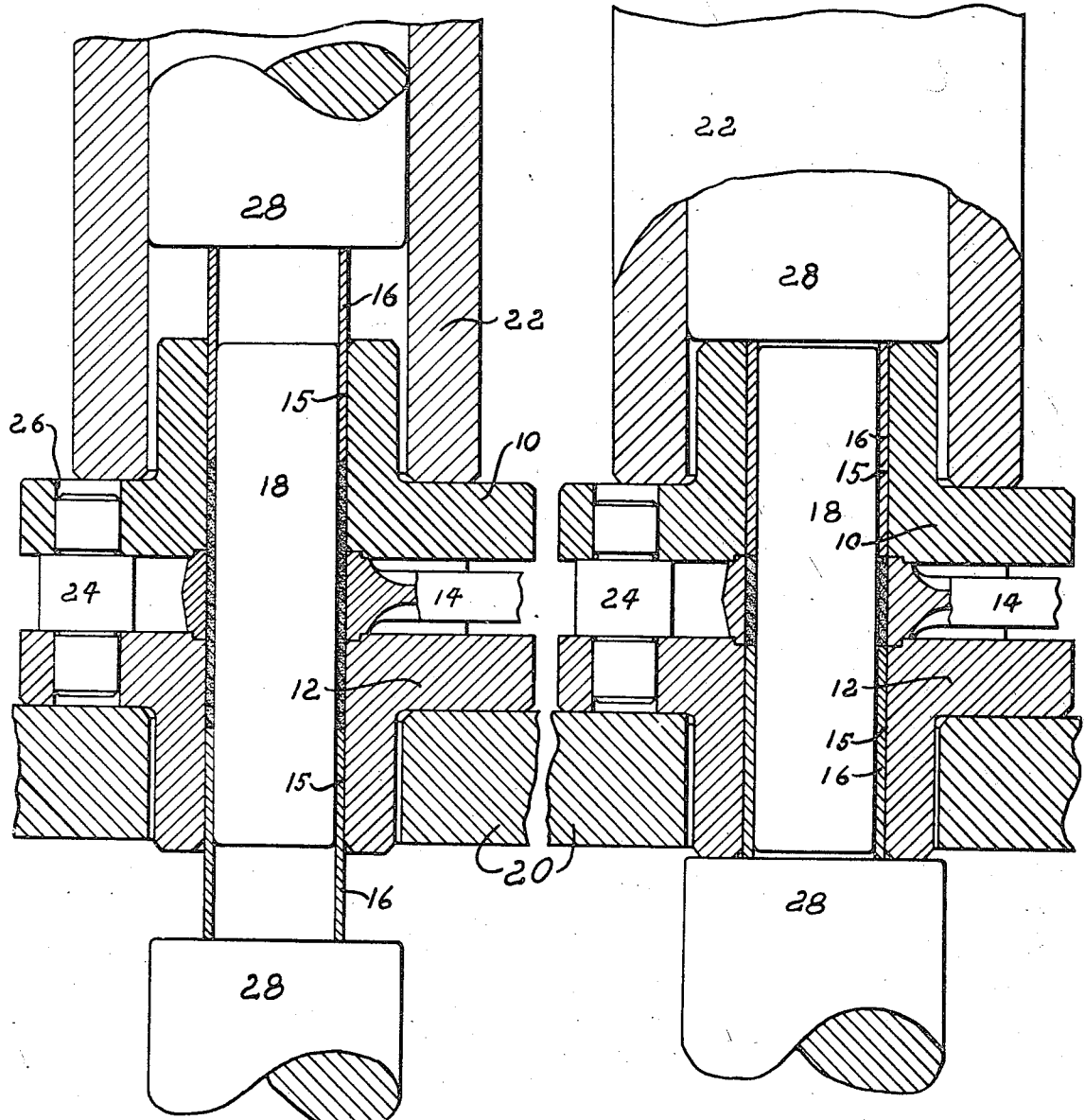

1,896,939

UNITED STATES PATENT OFFICE

WILLIAM G. CALKINS AND MELBOURNE L. CARPENTIER, OF DETROIT, MICHIGAN, ASSIGNORS TO CHRYSLER CORPORATION, OF DETROIT, MICHIGAN, A CORPORATION OF DELAWARE

METHOD FOR MANUFACTURING BEARINGS

Application filed November 29, 1929. Serial No. 410,498.

This invention relates to a process of making bearings and is illustrated as embodied in a two part bearing for the lower end of a connecting rod which forms a connection between a piston and a crank shaft of an internal combustion engine.

Heretofore two part bearings have been formed with elliptical openings, or the openings may be defined more accurately as two semi-circular portions of an opening spaced apart by short straight side sections. The inner periphery of the opening has been coated with a cast bearing material such as bronze, babbitt etc., and the bearing sawed in two parts through the center of the opening. When the parts are then assembled together a circular opening is obtained, the straight side sections being removed by the saw-cut or the parting operation.

An important object of the present invention is to form an elliptical opening in a body portion, saw-cut the body portion through the center of the opening, assemble the two parts together with a very thin shim between projecting radially inwardly into the opening, and applying a frictional resisting coating to the inner periphery of the opening, on each side of the shim.

Another object of the invention is to compress a powdered metal, by the use of cylindrical dies, into an opening in the connecting rod bearing, and sinter the compressed powered metal in the opening forming a bond between the metal and the inner periphery of the opening.

Other objects and advantages of the invention will more fully appear from the following description taken in connection with the accompanying drawings, in which:

Fig. 1 is a sectional view illustrating a machine for compressing a powdered metal into a connecting rod bearing, the parts of the machine being shown in a position before pressure is applied thereto.

Fig. 2 is a sectional view corresponding to Fig. 1 showing the dies in a position after a pressure has been applied to the members.

Figure 3:
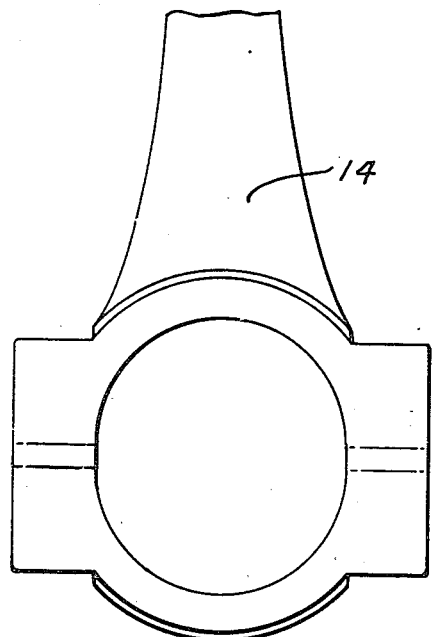
Fig. 3 is a view illustrating a connecting rod bearing having an elliptical opening, the inner periphery of which is to receive the bearing material.
Figure 4:
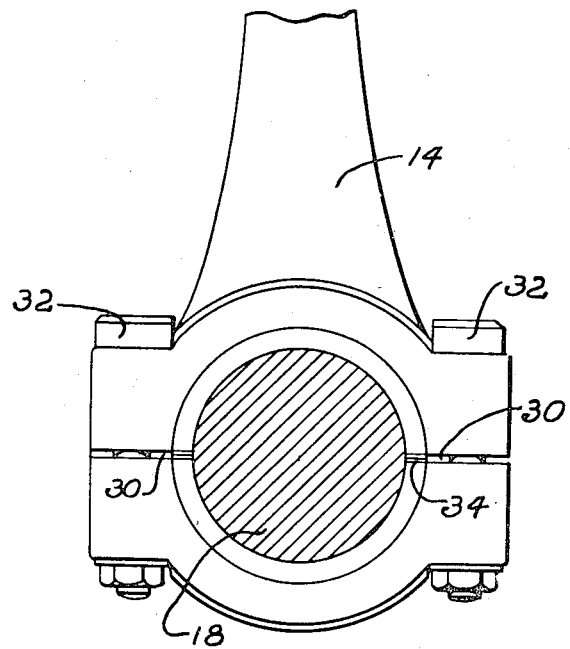
Fig. 4 is a view showing the bearing in two parts with the intermediate shims in position to form the bearing material into two parts corresponding to the two parts of the connecting rod bearing.

Referring to the drawings and particularly to Figs. 1 and 2, we have shown a conventional pressing machine. The reference numerals 10 and 12 designate upper and lower die members respectively, which clamp the opposite faces of a connecting rod bearing 14 therebetween. The die members 10 and 12 are each provided with aligned openings 15 having a diameter corresponding to the diameter of the opening in the connecting rod bearing 14. The connecting rod bearing 14 is received between the die members so that the opening in the connecting rod bearing is in axial alignment with the openings 14. A cylindrical sleeve 16 is received in the outer ends of the openings 15 and a pilot pin 18 is received in the sleeves 16. A support 20 is provided for the lower die member and a reciprocating member 22 is adapted to force the upper die member toward the lower die member. Pins 24 carried by one of the die members are received in openings 26 to serve as guides to properly locate the one die member relative to the other die member. Upper and lower reciprocating heads 28 are adapted to force the sleeves 16 toward the bearing and compress a powdered metal therebetween. It will be understood that the lower sleeve may be in a position, as shown in Fig. 1, with the pilot pin in position. The powdered metal is then placed in the annular space between the outer periphery of the pilot pin and the inner peripheries of the upper and lower dies and the bearing. The upper sleeve is then placed between the upper die and the pilot pin and the reciprocating heads 28 brought together to a position as shown in Fig. 2.

In order that the bearing opening may be circular when it is finished it is desirable to cast an integral bearing with an elliptical opening as shown in Fig. 3. The bearing is formed in two parts by sawing the sides of the bearing on the dotted line indicated in Fig. 3 so that when the two parts are placed together, as in securing the bearing to a crank shaft, the opening is circular.

When a bearing having an elliptical opening is formed in this manner, it is necessary to provide elliptical dies and sleeves for compressing the powdered metal in the elliptical opening or if the powdered metal is compressed in the bearing after the saw-cutting operation, it is necessary to perform another operation, that of saw-cutting the compressed powdered metal material. Both of these methods are objectionable, the first necessitating the use of elliptical dies and sleeves which are very difficult to properly assemble to maintain a constant wall thickness. The second method is objectionable in that it requires an additional operation.

We have found that by providing a bearing with an elliptical opening such as shown in Fig. 3, the bearing may be saw-cut and the two parts placed together to form a circular opening when thin shims 30 are placed between the two parts. The parts are then spaced by these thin shims 30 which project beyond the inner periphery of the opening for engagement with the pilot pin 18. The two parts are then secured together by bolts 32 and the bearing is placed between the two die members 10 and 12 above referred to. By providing a circular opening in the bearing member, after the shims 30 are in position, a cylindrical pilot pin 18 and cylindrical sleeves 16 may be used without the necessity of accurately positioning the sleeves relative to the pilot pin as would be the case if elliptical sleeves were used.

Figure 5:
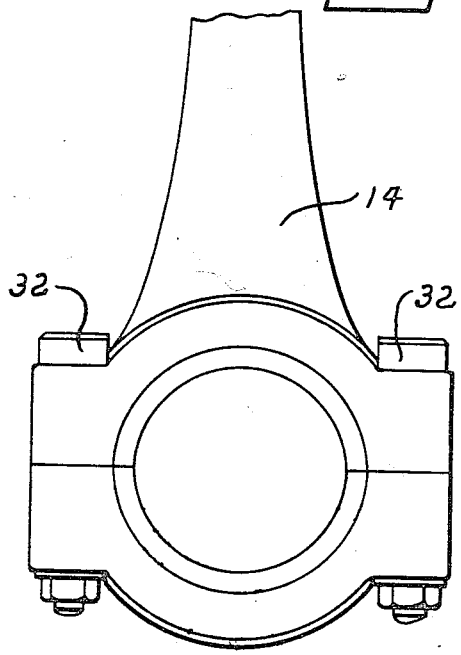
Fig. 5 is a view corresponding to Fig. 4 with the shims removed.
Figure 6:
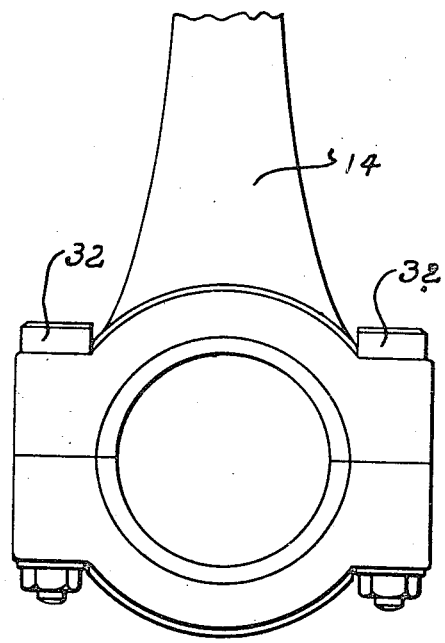
Fig. 6 is a view corresponding to Fig. 5 showing the bearing after the inner periphery of the bearing has been machined.

The portion 34 of the shims 30, which projects between the inner periphery of the bearing and the outer periphery of the pilot pin, segregates the powdered metal into the two parts of the bearing. After the powdered metal is compressed in the bearing, as shown in Fig. 2, the bolts 32 and pin 18 may be removed and the shims taken out leaving a two part bearing, both parts of which may be sintered. When the parts are sintered such as by heating, the powdered metal becomes a hard porous structure capable of absorbing lubricant and is bonded to the inner periphery of the semi-circular members. When the parts are assembled the inner periphery of the bearing material has a very slight elliptical opening, as shown in Fig. 5. The outer periphery of the bearing material or the inner periphery of the opening in the connecting rod is to a certain extent elliptical but due to the fact that it is so slight it raises no serious objection. The inner periphery of the bearing material is then machined cylindrical as shown in Fig. 6 and the connecting rod and its bearings are then ready to be assembled on a crank shaft.

Various changes including the size, shape and arrangement of parts may be made without departing from the spirit of our invention and it is our intention to cover by our claims such changes as may be reasonably made without departing from the scope of our invention.

What we claim is:

1. The method of forming a two part bearing which consists in forming an elliptical opening in a one part member, parting the member adjacent the center of the opening by removing a portion of the wall of the opening, assembling the two parts together with shims therebetween to make the opening circular, said shims projecting radially into the opening, inserting a cylindrical member into and coaxial with the opening, and compressing a powdered metal into the annular space between said cylindrical member and said two part member.

2. The method of forming connecting rod bearings which consists in placing a pin coaxially in the bearing opening of the rod to provide an annular space between the rod and the pin, placing opposite radial projections from the inner periphery of the rod to the outer periphery of the pin in the annular space, compressing powdered metal into the annular space, and bonding the compressed powdered metal to the inner periphery of the opening in the rod.

3. The method of forming connecting rod bearings which consists in clamping a two part bearing around a pilot pin coaxial therewith to provide an annular space between the inner periphery of the bearing opening and the outer periphery of the pilot pin, arranging shim like projections between the adjacent faces of the two parts of the bearing, said projections dividing the annular space into two portions, and compressing a powdered metal into the two portions of the annular space.

4. The method of forming a connecting rod bearing which consists in clamping the open end of a connecting rod between members having a cylindrical opening corresponding in diameter to the diameter of the opening in the rod, coaxially arranging a cylindrical member in the opening of the rod and the clamping members to provide an annular space between it and the same and compressing a powdered metal into the annular space by moving sleeve members in the annular space toward said rod.

5. The method of forming a bearing which consists in providing an outer retaining wall and an inner retaining wall, said walls being spaced apart to provide a cylindrical space therebetween, positioning opposite radially extending members in the cylindrical space to divide the cylindrical space into semi-cylindrical portions, compressing powdered metal into the semi-cylindrical portions and sintering to form a bond between the outer retaining wall and the powdered metal.

6. The method of forming a two part bearing which consists in forming an elliptical opening in a one part member, parting the member adjacent the center of the opening by removing a portion of the wall of the opening, assembling the two parts so formed, inserting a cylindrical member into and coaxial with the opening, and compressing a bearing material into the annular space between said two part member and the cylindrical member by the use of a cylindrical sleeve member.

7. The method of forming a connecting rod bearing which consists in forming an opening in the connecting rod, arranging a member in the opening to provide a space between the outer periphery of the member and the inner periphery of the opening in the rod, compressing powdered metal in the space, removing the member, and sintering the powdered metal in the opening to form a hard porous bearing and to form a bond between the bearing material and the inner periphery of the opening in the connecting rod.

WILLIAM G. CALKINS.
MELBOURNE L. CARPENTIER.